United States Patent [19]
Medina

[11] 3,800,824
[45] Apr. 2, 1974

[54] CHECK VALVE
[75] Inventor: Conrad R. Medina, Des Plaines, Ill.
[73] Assignee: Mark Controls Corporation, Evanston, Ill.
[22] Filed: Mar. 12, 1973
[21] Appl. No.: 339,779

[52] U.S. Cl. ............................... 137/541, 137/543
[51] Int. Cl. ............................................ F16k 15/06
[58] Field of Search ...... 137/541, 543, 543.13, 540, 137/533.21, 533.23, 533.25, 614.03, 614.04, 542; 251/149.6, 145, 147

[56] References Cited
UNITED STATES PATENTS

| 3,734,456 | 5/1973 | Varrin et al. | 251/145 |
| 2,608,210 | 8/1952 | St. Clair | 137/541 |
| 2,594,641 | 4/1952 | Griffith et al. | 137/543 |
| 3,288,167 | 11/1966 | Gibson | 137/541 |
| 3,334,659 | 8/1967 | Magorien | 137/543 X |

Primary Examiner—William R. Cline
Attorney, Agent, or Firm—Mason, Kolehmainen, Rathburn & Wyss

[57] ABSTRACT

A check valve for controlling the flow of a fluid in a fluid system includes a valve stem guide formed by an assembly of a plurality of thin, resilient members biased together in a contacting engagement and forming an elongated guide channel for the valve stem. The assembly further forms a limit or shoulder for a compression spring used to bias a poppet of the check valve to a closed condition. Each of the members of the assembly includes a plurality of segments. In an unbiased assembled condition, where N equals the number of members in the assembly, two of the segments of each of the N members form an angle of substantially greater than 360/N degrees. In a biased assembled condition, the same two segments of each of the N members form an angle of approximately 360/N degrees.

10 Claims, 5 Drawing Figures

PATENTED APR 2 1974 3,800,824
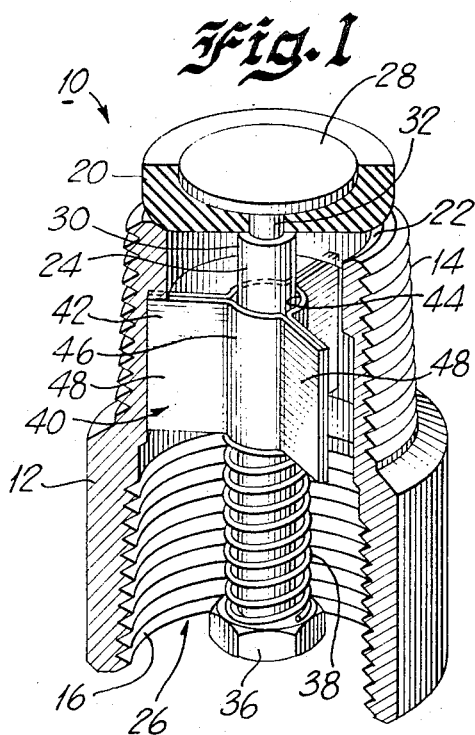
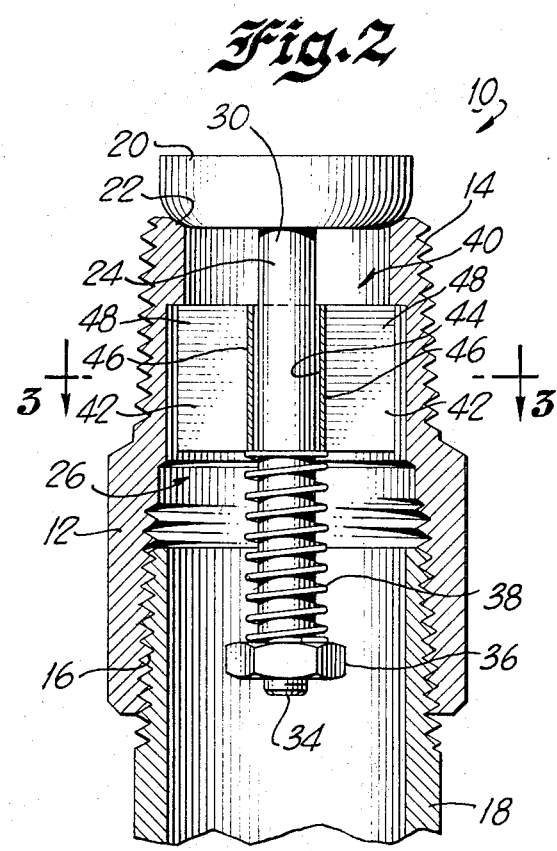
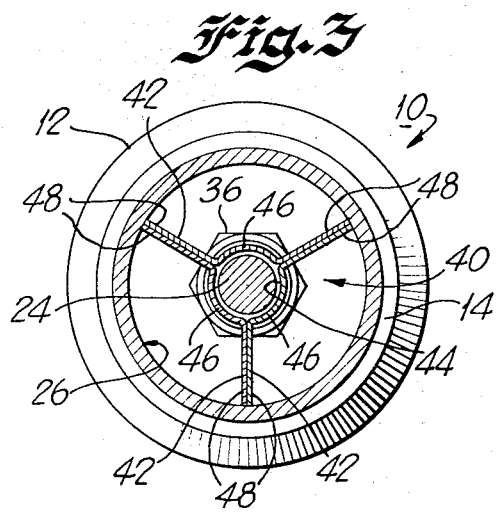
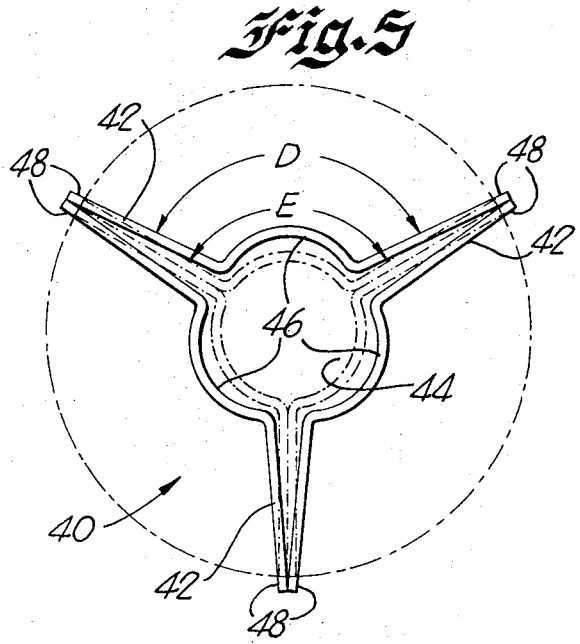
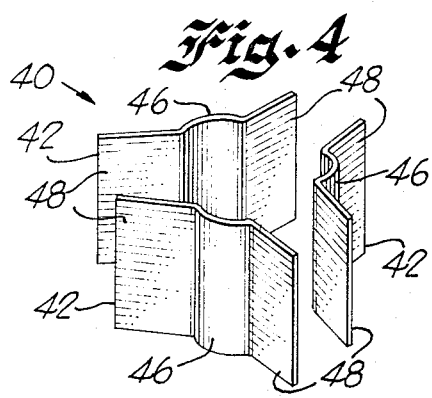

CHECK VALVE

BACKGROUND OF THE INVENTION

1. Field of the Invention

The present invention relates generally to valves for controlling the flow of the fluid in a fluid system; and, more particularly, to an improved valve stem guide for controlling the movement and location of a valve stem in a check or relief valve.

2. Description of the Prior Art

Check valves or relief valves are well-known devices for controlling the flow of a fluid in a fluid system. One common characteristic of many prior art check valves is their relatively complex and, thus, expensive construction. Examples of typical prior art check valves are the devices disclosed in U.S. Pat. Nos. 2,594,641; 3,288,167; 3,334,659; and 3,473,561.

With more specific reference to the prior art device disclosed in U.S. Pat. No. 3,288,167, a relief valve is disclosed for use in a fluid system. The relief valve includes valve stem guide member 42 for guiding a valve stem 32 and for forming an upper limit or shoulder against which a compression spring 40 may abut. The valve stem guide member 42 is maintained a spaced distance from a body 10 by a spacer assembly 48 formed by a plurality of three identical plates 50. The spacer assembly 48 does not function as a valve stem guide or as a limit or shoulder for the compression spring 40. The spacer assembly 48 merely functions to position an additional component, the valve stem guide member 42, in position within a bore 14 of the body 10. Thus, the above-mentioned prior art patent discloses a relief valve having a relatively complex valve stem guide and support structure.

Summary of the Invention

Accordingly, one subject of the present invention is to provide an improved check valve for use in fluid systems.

Another object of the present invention is to provide an improved check valve of a very simple and inexpensive construction, having a minimum number of parts.

A further object of the present invention is to provide a new and improved valve stem guide for a valve.

Another object of the present invention is to provide a new and improved valve stem guide for a check valve functioning both as a valve stem guide and as a limit or shoulder for a biasing means of the check valve.

In brief, the above and other objects of the present invention are achieved by providing a check valve for use in controlling the flow of a fluid in a fluid system. The check valve includes a novel valve stem guide formed by an assembly of a plurality of thin, resilient members biased together in a contacting engagement and forming an elongated guide channel for the valve stem. The assembly further functions as an upper limit or shoulder for a compression spring of the check valve.

The outer periphery of the assembly of resilient members in an unbiased assembled condition circumscribes an area in a plane transverse to the longitudinal direction of the guide channel of a greater magnitude than the surface area circumscribed by the outer periphery of the assembly of resilient members in a biased assembled condition. The assembly is therefore capable of maintaining itself in a secure engagement within a bore of a check valve by the outward bias of the outer extremities of the assembly against the inner surface of the bore of the check valve.

Each of the resilient members of the assembly includes a plurality of segments. The bias for the assembly is obtained by forming two segments of each of the members in an unbiased condition at an angle of substantially greater than 360/N degrees, where N equals the number of resilient members in the assembly. In a biased assembled condition, the two segments form an angle of approximately 360/N degrees.

The valve stem of the check valve preferably is securely attached at one longitudinal extremity to a poppet which mates in a sealing engagement with a valve seat of the check valve and which is maintained in proper alignment with the valve seat by the valve stem guide. The other longitudinal extremity of the valve stem is preferably threaded to receive a threaded nut which forms a lower limit or shoulder for the compression spring of the check valve.

The check valve thus formed provides a minimum mass profile in the longitudinal direction of the bore to thereby enable a mazimum fluid flow rate with a minimum amount of turbulence. Thus, a highly efficient, novel check valve having a simple and an inexpensive construction is provided for controlling the flow of a fluid in a fluid system.

BRIEF DESCRIPTION OF THE DRAWING

The above and other objects and advantages and novel features of the present invention may be better understood in light of the following detailed description of a preferred embodiment of the present invention illustrated in the accompanying drawing wherein:

FIG. 1 is a partially cut-away, partially elevational, perspective view of a preferred embodiment of a check valve constructed in accordance with the principles of the present invention;

FIG. 2 is a sectional view of the check valve of FIG. 1;

FIG. 3 is a cross-sectional view of the check valve of the present invention taken along line 3—3 of FIG. 2;

FIG. 4 is a perspective view of one embodiment of a plurality of members used to form a valve stem guide in accordance with the principles of the present invention;

FIG. 5 is a plan view of a valve stem guide constructed in accordance with the principles of the present invention illustrated in full lines in the unbiased condition prior to final assembly and in broken lines in the biased fully assembled condition.

DESCRIPTION OF THE PREFERRED EMBODIMENT

Referring to the drawing and initially to FIGS. 1 through 3, there is illustrated a new and improved check valve constructed in accordance with the principles of the present invention and designated as a whole by the reference numeral 10. The check valve 10 is used to control the flow of a fluid in a fluid system and includes a novel assembly of a plurality of thin, resilient members that simultaneously functions as a guide channel for a valve stem and as a limit or shoulder for a biasing member of the check valve.

The check valve 10 includes a body 12 having an upper threaded portion 14 and a lower threaded portion 16. The threaded portions 14 and 16 enable the check valve 10 to be securely positioned in a portion of a fluid system, such as in engagement with a pipe member 18. The check valve 10 includes a poppet 20 for forming a fluid-tight sealing engagement with a valve seat 22. In a sealed engagement, the poppet 20 and the valve seat 22 prevent the flow of a fluid through the check valve 10. In a nonsealing engagement or when disengaged, the poppet 20 and the valve seat 22 permit the flow of a fluid through the check valve 10.

A valve stem 24 securely attached to the poppet 20 longitudinally extends through a bore 26 of the check valve 10. The valve stem 24 is utilized to control the movement of the poppet 20 with respect to the valve seat 22. The valve stem 24 may be connected to the poppet 20 by any suitable means such as by an upper portion 28 and a lower portion 30 both of greater cross-sectional areas than an intermediate portion 32.

The valve stem 24 includes a threaded end portion 34 for receiving a threaded nut 36. The threaded nut 36 functions as a lower limit or shoulder for a compression spring 38 that provides the bias necessary to maintain the poppet 20 and the valve seat 22 in a sealing engagement. When the force exerted by the pressure of the fluid in the check valve 10 against the surface of the poppet 20 exceeds an opposing bias force supplied by the compression spring 38, the poppet 20 disengages from the valve seat 22 to permit the fluid to flow through and exit from the check valve 10. The bias force imparted by the compression spring 38 may be adjusted by varying the longitudinal position of the threaded nut 36 on the threaded end portion 34 of the valve stem 24. Thus, the operation of the check valve 10 can be easily adjusted to permit fluid flow at any desired fluid pressure.

In accordance with an important feature of the present invention, a valve stem guide assembly 40 is provided for both positioning the valve stem 24 within the bore 26 of the check valve 10 and for controlling the movement of the valve stem 24 along a longitudinal axis coincident with the central longitudinal axis of the bore 26. By controlling the position and movement of the valve stem 24, the guide assembly 40 controls the position and movement of the poppet 20 to cause the poppet 20 to engage the valve seat 22 in a proper alignment. The guide assembly 40 further functions as an upper limit or shoulder for the compression spring 38.

In accordance with an important advantage of the present invention, the guide assembly 40 is formed by a plurality of thin, resilient members 42 and is inserted in the bore 26 of the check valve 10 to thereby form an elongated guide channel 44 that serves as a guide for the valve stem 24. In the embodiment of FIGS. 4 and 5, the guide assembly 40 is formed by three members 42 each having a plurality of segments: a central curved segment 46 and a plurality of outer substantially flat segments 48. As an example of a suitable material, the members 42 may be formed from a sheet of 20 gauge stainless steel, approximately .032 inches in thickness. Preferably, the segments 46 are dimensioned to provide only a very slight clearance between the inner surface of the guide channel 44 and the outer surface of the valve stem 24 to thereby maintain the lateral movement of the valve stem 24 at an absolute minimum while permitting free longitudinal movement.

The flat segments 48 (FIG. 5) of each of the members 42 in an unbiased condition form or subtend an angle D of substantially greater than 360/N degrees, where N equals the number of members 42 in the guide assembly 40. For the embodiment illustrated in FIGS. 4 and 5, where three members 42 are used, N equals 3 and the angle D is substantially greater than 120 degrees. For example, in the illustrated arrangement, the angle D is equal to 130 degrees.

The flat segments 48 (FIG. 5) of each of the members 42 in the biased, assembled condition form or subtend an angle E of approximately 360/N degrees, where N equals the number of the members 42 in the guide assembly 40. For the embodiment illustrated in FIGS. 4 and 5 where three members 42 are used, N equals 3 and the angle E is approximately 120 degrees.

In accordance with a further important feature of the present invention, and as illustrated in FIG. 5, the outer periphery of the plurality of members 42 forming the guide assembly 40 in an unbiased assembly condition circumscribes an area in a plane transverse to the longitudinal direction of the guide channel 44 of a greater magnitude than the area circumscribed by the periphery of the members 42 in their biased assembled condition. Thus, when the members 42 are in their biased assembled condition, the guide assembly 40 may be inserted into the bore 26 of the check valve 10 and is maintained in a fixed position within the bore 26 by the bias force exerted by the outer edges of the members 42 against the inner surface of the bore 26. The members 42 are preferably constructed of such dimensions that, in their biased assembled condition, the outer periphery of the guide assembly 40 formed by the members 42 approximately equals the inner circumference of that portion of the bore 26 at which the guide assembly 40 is positioned. A slight allowance in the dimensions of the members 42 for clearance in inserting the guide assembly 40 in a biased condition into the bore 26 should be provided. After insertion within the bore 26, the outer extremities of the guide assembly 40 slightly extend from a fully biased condition in order to contact the surface of the bore 26.

As a result of the new and improved valve stem guide assembly 40 and as clearly illustrated in FIG. 3, the inner components of the check valve 10 are small in profile along the longitudinal axis of the bore 26 thereby resulting in minimal obstruction of the flow of a fluid through the check valve 10. Thus, the check valve 10 provides a maximum fluid flow rate with a minimum amount of pressure reduction or turbulence.

Many modifications and variations of the present invention are possible in light of the above teachings. For example, for check valves 10 having rather long valve stems 24, a plurality of guide assemblies 40 formed by the thin, resilient members 42 may be longitudinally disposed within the bore 26, either in a spaced or in an abutting relation, to provide one or more guide channels 44 of sufficient length to control the longitudinal movement of such a valve stem 24. The guide assembly 40 may also be formed by a number of resilient members 42 greater than the three members 42 illustrated in the specific embodiment of FIGS. 4 and 5 without departing from the principles of the present invention. Thus, it is to be understood that, within the scope of the appended claims, the invention may be practiced otherwise as specifically described.

What it is claimed and desired to be secured by Letters Patent of the United States is:

1. A valve for controlling the flow of a fluid in a fluid system comprising
   an elongated body,
   a bore in said body,
   a valve seat at one end portion of said bore,
   a poppet adapted to engage said valve seat in a fluid-tight sealing engagement,
   an elongated valve stem attached to said poppet and longitudinally extending through at least a portion of said bore and
   means in said bore for guiding said valve stem, said guiding means comprising a plurality of thin, resilient members assembled and biased together in a contacting engagement and forming an elongated guide channel for said valve stem, the outer periphery of said plurality of members in an unbiased assembled condition circumscribing an area in a plane transverse to the longitudinal direction of said guide channel of a greater magnitude than the area circumscribed by said periphery of said plurality of members in a biased assembled condition.

2. A valve as defined in claim 1 further comprising biasing means for maintaining said popppet and said valve seat in said sealing engagement.

3. A valve as defined in claim 2 wherein said biasing means includes an elongated compression spring encircling a portion of said valve stem.

4. A valve as defined in claim 3 further comprising a threaded nut engagable with a portion of said valve stem and forming a lower shoulder or limit for said spring, said plurality of members in said biased assembled condition forming an upper shoulder or limit for said spring.

5. A valve for controlling the flow of a fluid in a fluid system comprising
   an elongated body,
   a bore in said body,
   a valve seat at one end portion of said bore,
   a poppet adapted to engage said valve seat in a fluid-tight sealing engagement,
   an elongated valve stem attached to said poppet and longitudinally extending through at least a portion of said bore and
   means in said bore for guiding said valve stem, said guiding means comprising a plurality of thin, resilient members assembled and biased together in a contacting engagement and forming an elongated guide channel for said valve stem, the outer periphery of said plurality of members in an unbiased assembled condition circumscribing an area in a plane transverse to the longitudinal direction of said guide channel of a greater magnitude than the area circumscribed by said periphery of said plurality of members in a biased assembled condition, each of said plurality of members including a plurality of segments, two segments of said plurality of segments forming an angle substantially greater than 360/N degrees in said plane, where N equals the number of said plurality of members, when said members are in said unbiased assembled condition and forming an angle of approximately 360/N degrees when said plurality of members are in said biased assembled condition.

6. A valve as defined in claim 5 where N equals 3.

7. A device for guiding the longitudinal movement of a valve stem through a portion of an elongated bore of a valve comprising
   a plurality of thin, resilient members assembled and biased together in a contacting engagement and forming an elongated guide channel for guiding said valve stem, the outer periphery of said plurality of members in an unbiased assembled condition circumscribing an area in a plane transverse to the longitudinal direction of said guide channel of a greater magnitude than the area circumscribed by said periphery of said plurality of members in a biased assembled condition.

8. A device as defined in claim 7 wherein each of said plurality of members have substantially the same physical dimensions as the remaining ones of said plurality of members.

9. A device for guiding the longitudinal movement of a valve stem through a portion of an elongated bore of a valve comprising
   a plurality of thin, resilient members assembled and biased together in a contacting engagement and forming an elongated guide channel for guiding said valve stem, the outer periphery of said plurality of members in an unbiased assembled condition circumscribing an area in a plane transverse to the longitudinal direction of said guide channel of a greater magnitude than the area circumscribed by said periphery of said plurality of members in a biased assembled condition, each of said plurality of members including a plurality of segments, two segments of said plurality of segments forming an angle substantially greater than 360/N degrees in said plane, where N equals the number of said plurality of members, when said members are in said unbiased assembled condition and forming an angle of approximately 360/N degrees when said plurality of members are in said biased assembled condition.

10. A device as defined in claim 9 where N equals 3.

* * * * *